(12) United States Patent
Armstrong

(10) Patent No.: US 8,059,267 B2
(45) Date of Patent: Nov. 15, 2011

(54) ORIENTATION DEPENDENT RADIATION SOURCE AND METHODS

(75) Inventor: Brian Stewart Randall Armstrong, Shorewood, WI (US)

(73) Assignee: Go Sensors, LLC, Sarasota, FL (US)

( * ) Notice: Subject to any disclaimer, the term of this patent is extended or adjusted under 35 U.S.C. 154(b) by 183 days.

(21) Appl. No.: 12/547,132

(22) Filed: Aug. 25, 2009

(65) Prior Publication Data

US 2010/0046857 A1 Feb. 25, 2010

Related U.S. Application Data

(60) Provisional application No. 61/189,881, filed on Aug. 25, 2008.

(51) Int. Cl.
G01C 1/00 (2006.01)
(52) U.S. Cl. ............... 356/152.3; 356/152.1; 356/152.2; 356/139.03; 356/139.07
(58) Field of Classification Search ......... 356/3.01–28.5
See application file for complete search history.

(56) References Cited

U.S. PATENT DOCUMENTS

| 5,936,722 | A | 8/1999 | Armstrong et al. |
| 5,936,723 | A | 8/1999 | Schmidt et al. |
| 6,384,908 | B1 | 5/2002 | Schmidt et al. |
| 2004/0233461 | A1 * | 11/2004 | Armstrong et al. ........... 356/620 |

* cited by examiner

*Primary Examiner* — Thomas Tarcza
*Assistant Examiner* — Luke Ratcliffe
(74) *Attorney, Agent, or Firm* — Gehrke & Associates, SC; Lisa M. Gehrke

(57) ABSTRACT

Improvements to the art of orientation measurement are disclosed whereby the phase angle of each of the plurality of orientation dependent radiation patterns is measured at a single common and unique point of measurement on the observation surface and correspondingly in the image of the observation surface, and whereby a central landmark is located at the point of measurement without loss of accuracy in the determination of the plurality of phase angles of orientation dependent radiation so that the precise point of measurement can be determined in the image without errors introduced by an offset between the positions of landmarks and the position of phase angle measurement. Additionally, the preferred embodiment provides characteristics of the central landmark and other landmarks of the orientation dependent radiation source which provide a means to resolve the cosine ambiguity, which is known to those skilled in the arts of image-based orientation measurement as a challenge and source of error for prior-art image-based orientation measurement means.

4 Claims, 15 Drawing Sheets

Front View

ORIENTATION DEPENDENT RADIATION SOURCE AND METHODS

CROSS REFERENCE TO RELATED APPLICATION

The present application is a provisional conversion of and claims priority to U.S. Provisional Application No. 61/189,881, filed Aug. 25, 2008.

BACKGROUND OF THE INVENTION

1. Field of Invention

The present invention relates to Image Metrology and more particularly to six degree-of-freedom (DOF) spatial measurement from images using an Orientation Dependent Radiation (ODR) Source. The Orientation Dependent Radiation is used to accurately determine the ODR Source's pose from an image. The invention relates more particularly to improvements to the apparatus of the ODR Source and the methods of interpreting an image of the ODR Source to simplify the analysis and improve the accuracy of orientation measurement, and to resolve the Cosine Ambiguity.

2. Discussion of Relevant Prior Art

Orientation Dependent Radiation (ODR) sources are known to the prior art. There construction and use is taught in U.S. Pat. Nos. 5,936,722, 5,936,723 and 6,384,908.

The prior art is illustrated in FIGS. 1 to 2. In FIG. 1, there are a plurality of ODR Regions and each region contains ODR Patterns. ODR Patterns (104) are schematically illustrated in FIG. 1. The Orientation Dependent Radiation Pattern is an approximately sinusoidal pattern of radiation which covers the entire ODR Region.

Each ODR Pattern includes a Detectable Property, such as pattern Phase Angle that can be measured from an image and used to determine the out-of-plane rotation of the ODR Source. The out-of-plane rotation generally can not be accurately measured without the use of Orientation Dependent Radiation. For example, the ODR Patterns give rise to an approximately sinusoidal pattern of intensity running along the length of each Longitudinal Axis of the patterns. Each ODR Region has a Longitudinal Axis (102) as shown schematically in FIG. 1. The Detectable Property is measured at a Point of Measurement (103), such as shown in FIG. 1 and in FIG. 2.

Landmarks (110) in FIG. 1, are used to determine the locations of the ODR source in an image, and to determine the locations of features in the image, such as lie of a Longitudinal Axis (102) and the Point of Measurement (103).

One significant feature in the image is the Point of Measurement (103) in FIG. 1 and FIG. 2. This is the point at which the Detectable Property of the Orientation Dependent Radiation is determined.

Those skilled in the arts will be aware that a Detectable Property measured at a Point of Measurement (103) in the image will depend upon the precise location in the image of that Point of Measurement. If Point of Measurement (103) is shifted, an error of measurement will arise.

Elements of the process of locating Point of Measurement (103) are illustrated in FIG. 2. Landmarks (110) are detected and located by image processing. The locations of the Landmarks (110) in the image are used to determine the Point of Measurement (103) in each of the ODR Regions (101). Only the process of locating Point of Measurement (103) for the upper right Orientation Dependent Radiation Pattern pictured in FIG. 1 is shown. The processes of locating any other Point of Measurement (103) follow, mutatis mutandis.

The process illustrated in FIG. 2 involves projecting the measured locations of Landmarks (110) along lines (202) drawn in the image to the Point of Measurement (103). In this projection process, inevitable small errors in the measured location of the Landmarks result in larger errors in determination of the Point of Measurement (103). Indeed, those skilled in the art of Image Metrology will realize that the errors in determining the location of the Point of Measurement (103) will be at least several times as great as the error in determining the location of any one Landmark. If the Landmark were located at the Point of Measurement (103), this compounding of small errors into large errors could be avoided. But the prior art offers no means to locate Landmarks at the Points of Measurement.

It is also well known to those skilled in the art of Image Metrology that features on the back (161b) of a Transparent Substrate which is tilted with respect to a camera appear shifted in an image relative to features on the front (163b) of the Transparent Substrate, as shown in FIG. 8. The magnitude of shift depends on the thickness and index of refraction of the substrate, in a well known way. This shift of the apparent position of a Landmark is hereinafter referred to as the Back-to-Front shift.

For Landmarks to be useful for accurately locating the Point of Measurement, they must lie on the observation surface of the target. This is because the Back-to-Front shift can not be accurately determined while the tilt of the ODR Source is unknown. And the Point of Measurement must be used to determine the Detectable Property of the Orientation Dependent Radiation, and thereby determine the tilt of the ODR Source. Thus, Landmarks used to determine the Point of Measurement must all be on the front of the ODR Source.

Those familiar with the arts of Image Metrology are also acquainted the Cosine Ambiguity. The Cosine Ambiguity is illustrated with the aid of FIGS. 3-8. FIG. 3 shows a possible pattern of Landmarks on an ODR Source. The ODR Source comprises a Transparent Substrate (120), Central Landmark (221), and another Landmark (222). A camera (140) acquires an image which is then analyzed. Possible orientations of target corresponding to $\phi=-30$ degrees, $\phi=0$ degrees and $\phi=+30$ degrees are seen in FIG. 4 at 131, 132 and 133, respectively. If the Central Landmark (221) and another Landmark (222a) are all on the Front Face (121) of the Transparent Substrate (120) as shown in FIG. 5, then the rotation produces foreshortening along the axis of rotation (150) as shown in FIG. 6. However, the constellation of Landmarks has essentially the same appearance whether the angle is positive or negative, as seen in FIG. 6 at 141a and 143a, with 142 showing an angle of 0 degrees.

Mathematically, the essentially identical constellation of Landmarks is reflected in the fact that the arc-cosine function has two possible solutions. Consider, for example if it is determined by analysis of the locations of Landmarks in an image that the tilt angle $\phi$ of an ODR Source corresponds to $\cos(\phi)=0.8660$. We then find two possible solutions for angle $\phi$, because both $\cos(-30°)=0.8660$ and $\cos(30°)=0.8660$. Said another way, the solution of the arc-cosine function is ambiguous.

In the field of Image Metrology, this ambiguity is referred to as the Cosine Ambiguity, and the two possible solutions are referred to as the two Branches of the Cosine Ambiguity, and Resolving the Cosine Ambiguity refers to determining the correct branch of the solution, which is to say the correct sign of the angles of the orientation measurement. The prior art ODR Sources offer no convenient means to Resolve the Cosine Ambiguity. Methods to Resolve the Cosine Ambiguity are known to the field of Image Metrology, but require that a feature, such as a ball on a stem, be added to the ODR Source. A ball on a stem is exposed to being knocked off, and greatly limits the utility of ODR-based orientation measurement in fields such as industrial automation or sports medicine.

BRIEF SUMMARY OF THE INVENTION

Image-based orientation measurement systems are well known to the prior art, such as are disclosed in U.S. Pat. Nos. 5,936,722, 5,936,723 and 6,384,908, included here by reference. In particular, an ODR source, as taught by U.S. Pat. No. 5,936,723 and U.S. Pat. No. 6,386,908, produces an ODR pattern on an Observation Surface having one or more Detectable Properties that co-vary with orientation and is the basis for orientation measurement. The Orientation Dependent Radiation is detected in an Observation Area, typically with a camera that produces an image of the Observation Surface of the ODR Source. In one embodiment, the Detectable Property of each of a plurality of ODR patterns is the phase angle of an approximately sinusoidal pattern of Orientation Dependent Radiation. The phase angle is measured at a specific Point of Measurement in the image. The Point of Measurement corresponds to a specific location on the Observation Surface. For accurate measurement of orientation, it is necessary that the Point of Measurement on the Observation Surface be a point at which the Detectable Property has a well known relationship to orientation, and it is necessary to accurately locate the Point of Measurement in the image. In the prior art, the Point of Measurement is inferred from one or more Landmarks on the Observation Surface, which are detected and located during analysis of the image.

The prior art includes several limitations. In particular, the methods and apparatus of the prior art includes Measurement Offsets between the Landmarks and the Point of Measurement. The calculation of said Measurement Offsets introduces error into the determination of the Point of Measurement, said error further introducing error in the analysis of the Orientation Dependent Radiation. In this way, said Measurement Offsets incorporated in the prior art limit the accuracy of orientation measurement. Additionally, the prior art provides no means for resolving the cosine ambiguity that arises in image-based orientation measurement.

BRIEF DESCRIPTION OF THE DRAWINGS

FIG. 12 shows example data (330) of an ODR Pattern as a function of position along the ODR Region Longitudinal Axis.

FIG. 13 additionally shows a curve fit to the data (331) and measurement of the Detectable Property from the curve at point (332), which ideally corresponds to the Point of Measurement on the ODR Region.

FIG. 14 shows example data (335) of an ODR Pattern as a function of position along a Split ODR Region. Because the ODR Region is split, there is a gap in the data. The gap is created by the Background to the Central Landmark (323) in FIG. 9.

FIG. 15 shows a curve fit to the data (336) and measurement of the Detectable Property from the curve (337), which ideally corresponds to the Point of Measurement on the ODR Region.

DETAILED DESCRIPTION OF THE INVENTION

Figure 9:
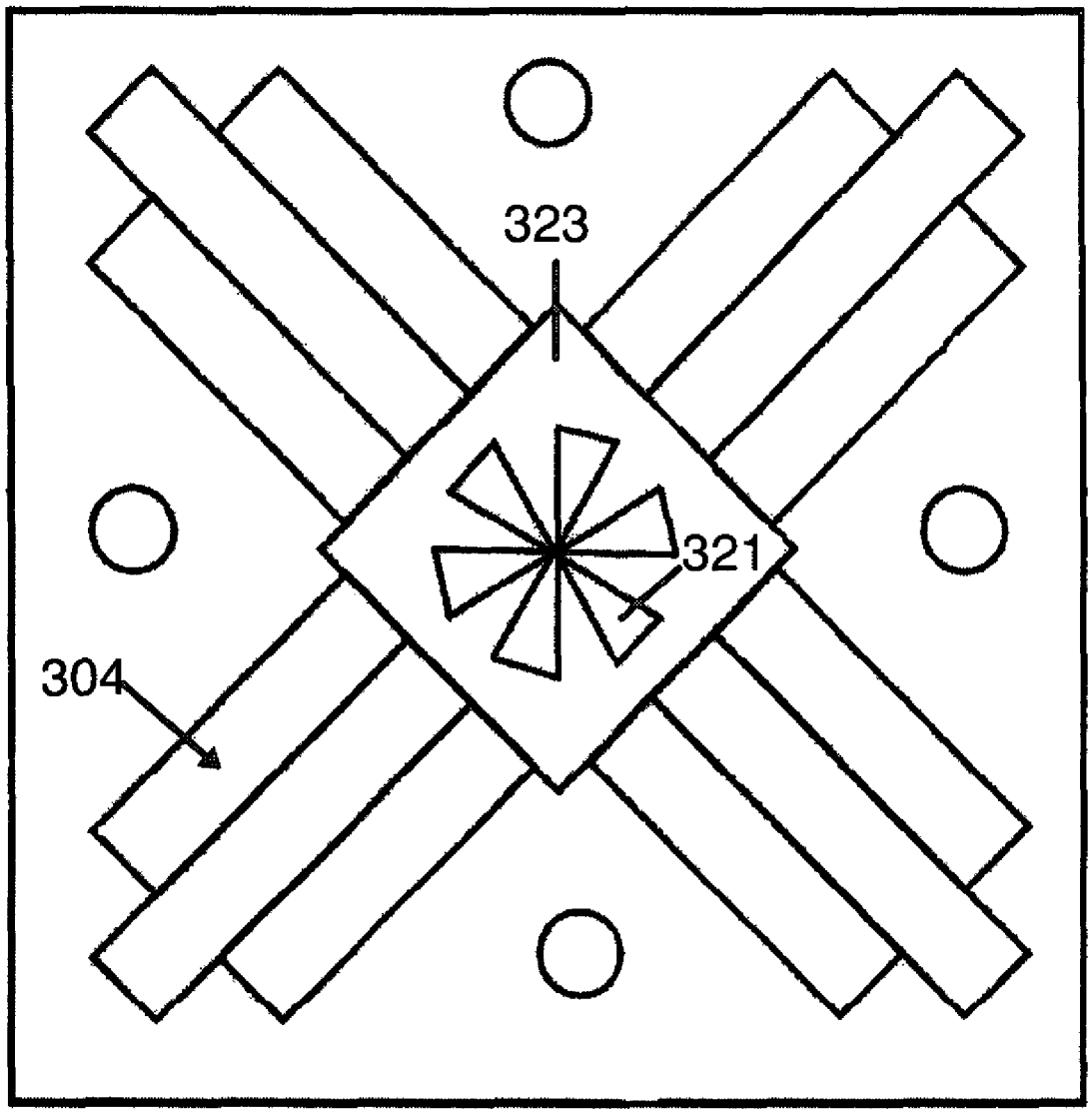
FIG. 9 is a schematic drawing of the ODR Source.
Figure 10:
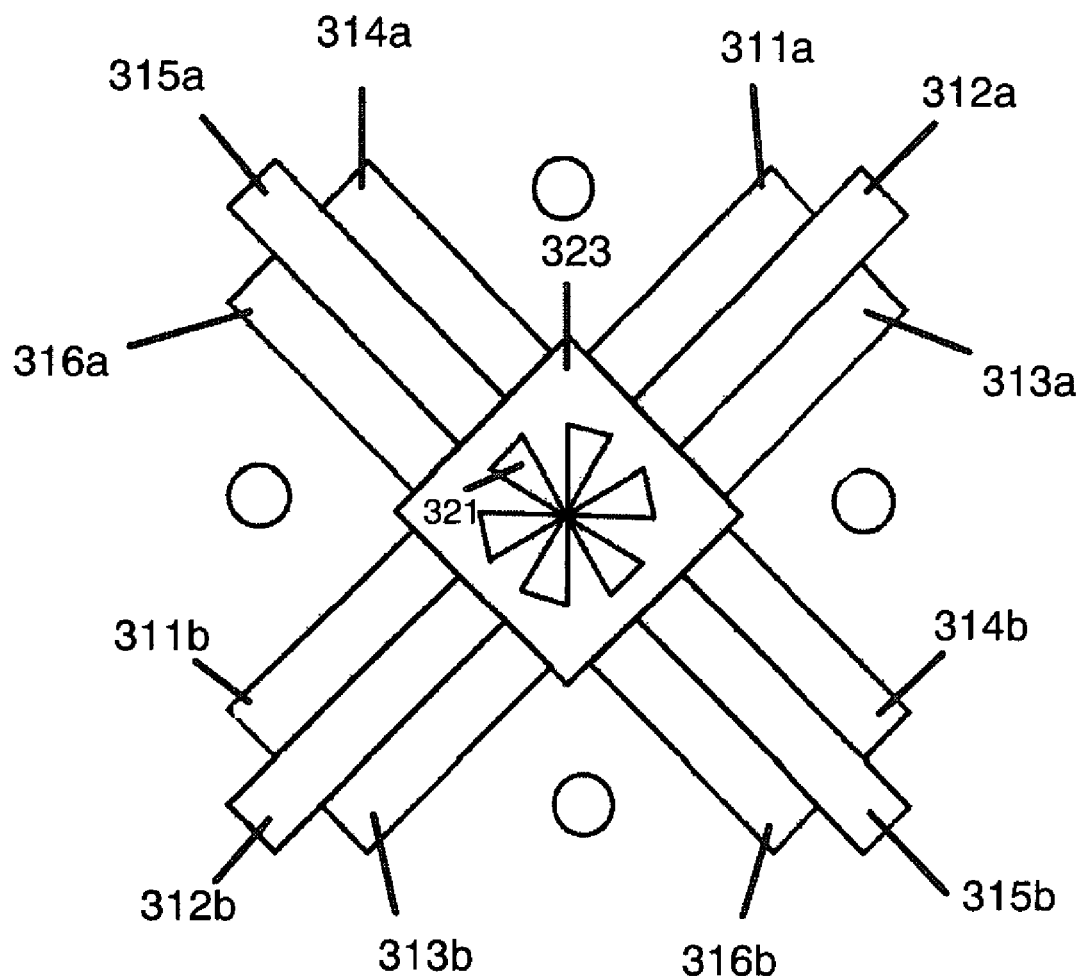
In FIG. 10, the ODR Regions are enumerated in detail, as described in the detailed description of the invention below. ODR Sub-Regions 311*a*, 311*b*, 313*a*, 313*b* form one ODR Region. ODR Sub-Regions 312*a*, 312*b* form one ODR Region. ODR Sub-Regions 314*a*, 314*b*, 316*a*, 316*b* form one ODR Region. ODR Sub-Regions 315*a*, 315*b* form one ODR Region. Thus, in the preferred embodiment there are a total of four ODR Regions producing four distinct ODR Patterns.
Figure 11:
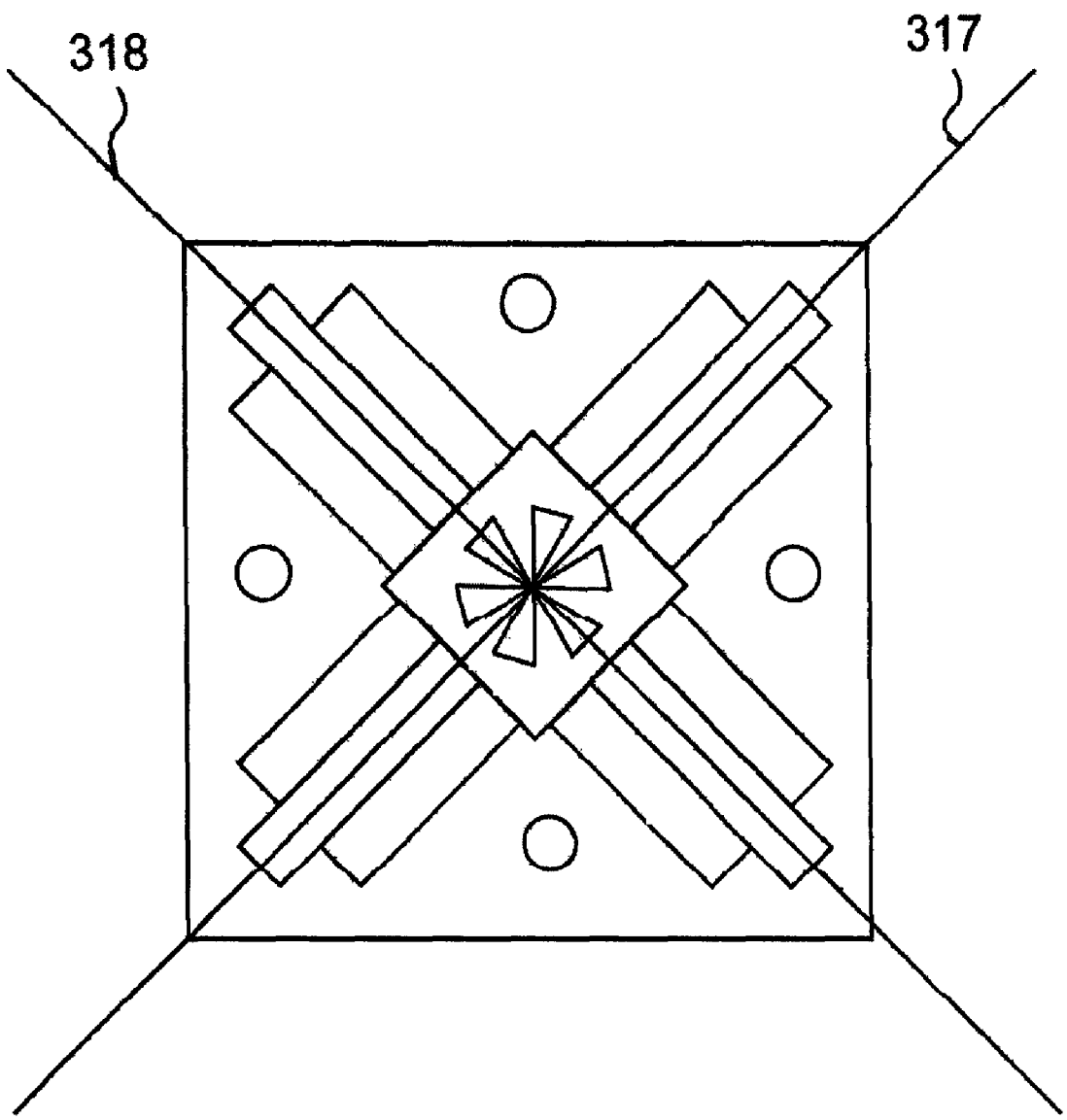
In FIG. 11, the Longitudinal Axes of the ODR Regions are shown at 317 and 318. The ODR Regions comprising ODR Sub-Regions 311*a*, 311*b*, 312*a*, 312*b*, 313*a* and 313*b* have Longitudinal Axis (317) as their Longitudinal Axis. The ODR Regions comprising ODR Sub-Regions 314*a*, 314*b*, 315*a*, 315*b*, 316*a* and 316*b* have Longitudinal Axis (318) as their Longitudinal Axis.

The preferred embodiment of the invention includes features of the ODR Source artwork illustrated in FIGS. 9-11. Regions generating Orientation Dependent Radiation are shown at 304. Unlike the prior art, all of the ODR regions in the preferred embodiment are split into two portions.

The Central Landmark (321) is provided in the center of the preferred embodiment of the ODR Source. A Background to the Central Landmark (323), a white field, is provided so that the Central Landmark (321) can be detected and located by image processing.

Each of the ODR Region is split at the center. For example in FIG. 10, a single ODR is shown at 311*a* and 311*b*, and likewise at numerals 312*a* and 312*b*, 313*a* and 313*b* and 314*a* and 314*b* and 315*a* and 315*b* and 316*a* and 316*b*. Because the Central Landmark (321) and Background to the Central Landmark (323) break the ODR Regions into two portions, as shown at 311*a* and 311*b*, or 312*a* and 312*b*, or 313*a* and 313*b*, or 314*a* and 314*b*, or 315*a* and 315*b*, or 316*a* and 316*b*, the ODR Regions of the preferred embodiment are referred to as Split ODR Regions.

While twelve sub-regions of the ODR Regions are enumerated in FIG. 10, shown at numerals 311*a*-316*b*, in fact there are only four distinct ODR Regions. The sub-regions are arranged to form four ODR Regions, each generating Orientation Dependent Radiation, according to:

Region 1.1: Shown in FIG. 10 at 312*a* and 312*b*.

Region 1.2: Shown in FIG. 10 at 312*a*, 311*b*, 313*a* and 313*b*.

Region 2.1: Shown in FIG. 10 at 315*a* and 315*b*.

Region 2.2: Shown in FIG. 10 at 314*a*, 314*b*, 316*a* and 316*b*.

In FIG. 11, the Longitudinal Axes of the ODR Regions are seen at 317 and 318. ODR Regions 1.1 and 1.2 lie along the Longitudinal Axis (317), and ODR Regions 2.1 and 2.2 lie along the Longitudinal Axis (318). In one embodiment, ODR Region 1.1 is disposed symmetrically about Longitudinal Axis (317). ODR Region 1.2 is symmetrically disposed about Region 1.1, and therefore about Longitudinal Axis (317).

Similarly ODR Region 2.1 is disposed symmetrically about Longitudinal Axis 318. ODR Region 2.2 is symmetrically disposed about Region 2.1, and therefore about Longitudinal Axis (318).

In the preferred embodiment, the Longitudinal Axes of the four ODR Regions intersect at a Point of Intersection. This is the Point of Measurement for all of the ODR Regions. In FIG. 9, this point is marked on the front of the ODR Source with the Central Landmark (321). By making the four Points of Measurement a single point on the Observation Surface, and placing the Landmark at that point, the requirement of the prior art to project from Landmarks to each Point of Measurement is removed. There is no projection operation in the preferred embodiment, the Landmark lies precisely at the Point of Measurement. Because the projection operation introduces substantial error, the preferred embodiment of the present invention leads to significantly greater accuracy than is possible with the prior art.

Figure 12:
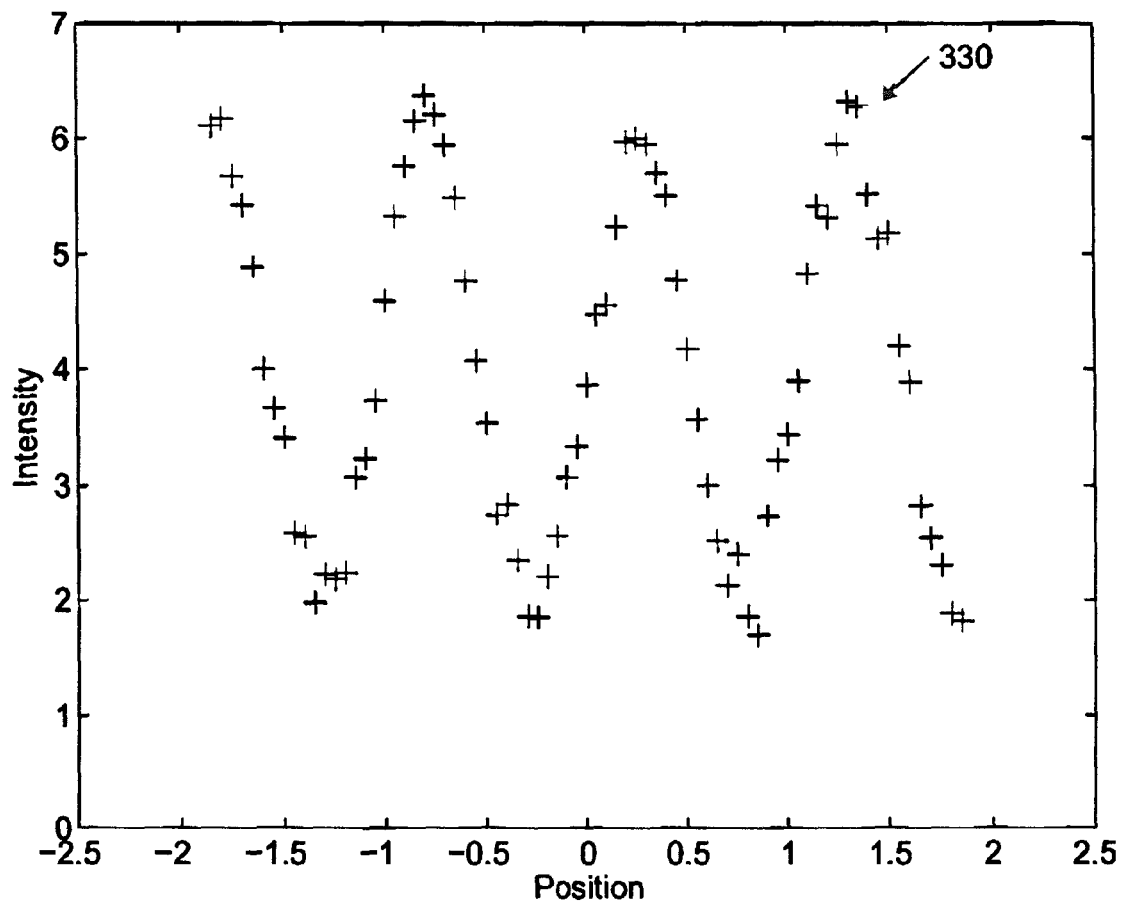
FIGS. 12-15 illustrate data process for measuring the Detectable Property of a Split ODR Region.
Figure 13:
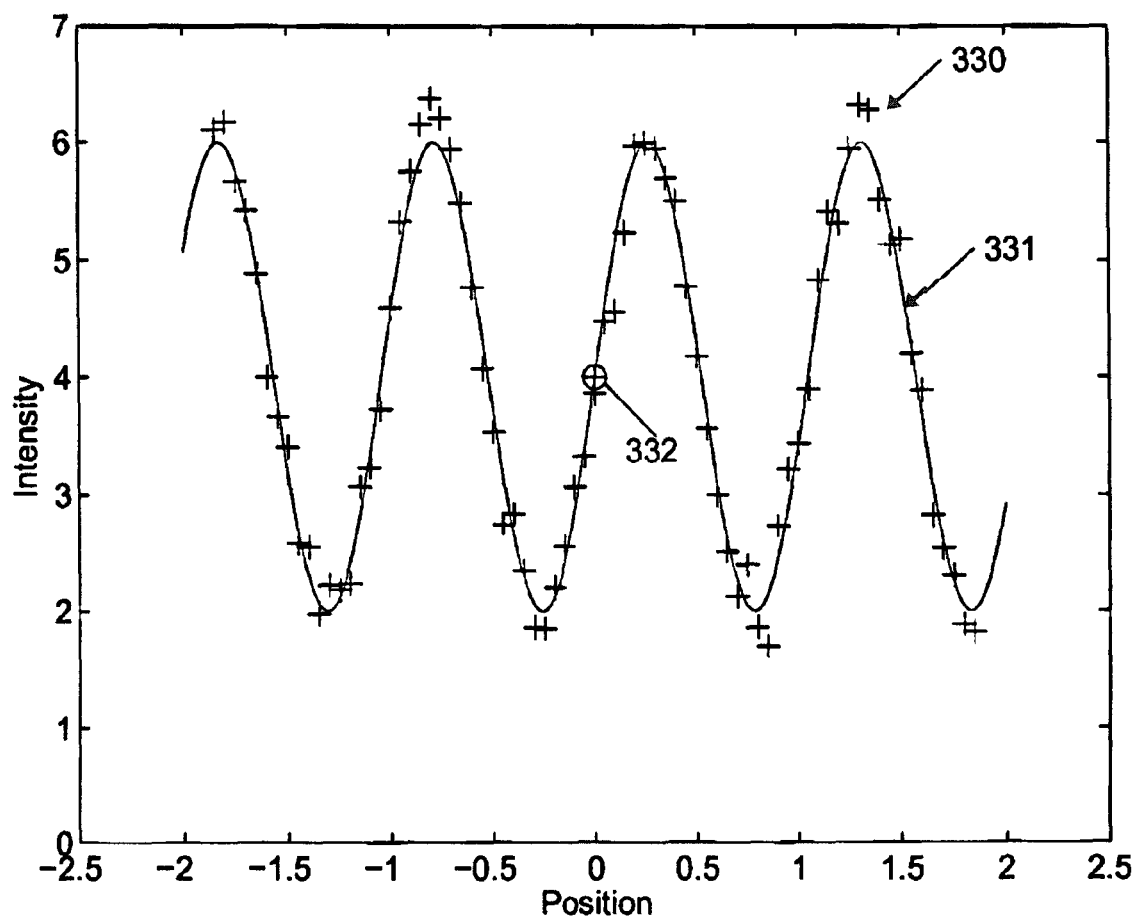

An additional aspect of the preferred embodiment is a Landmark occupies a central portion of each of the ODR regions. This leads to split ODR Regions. In FIG. 12, example data (330) for a prior art ODR Pattern are shown. During processing, a sinusoid is fit to the data (331) in FIG. 13, and the Detectable Property is measured at a point (332), which ideally corresponds to the Point of Measurement on the ODR Region.

Figure 14:
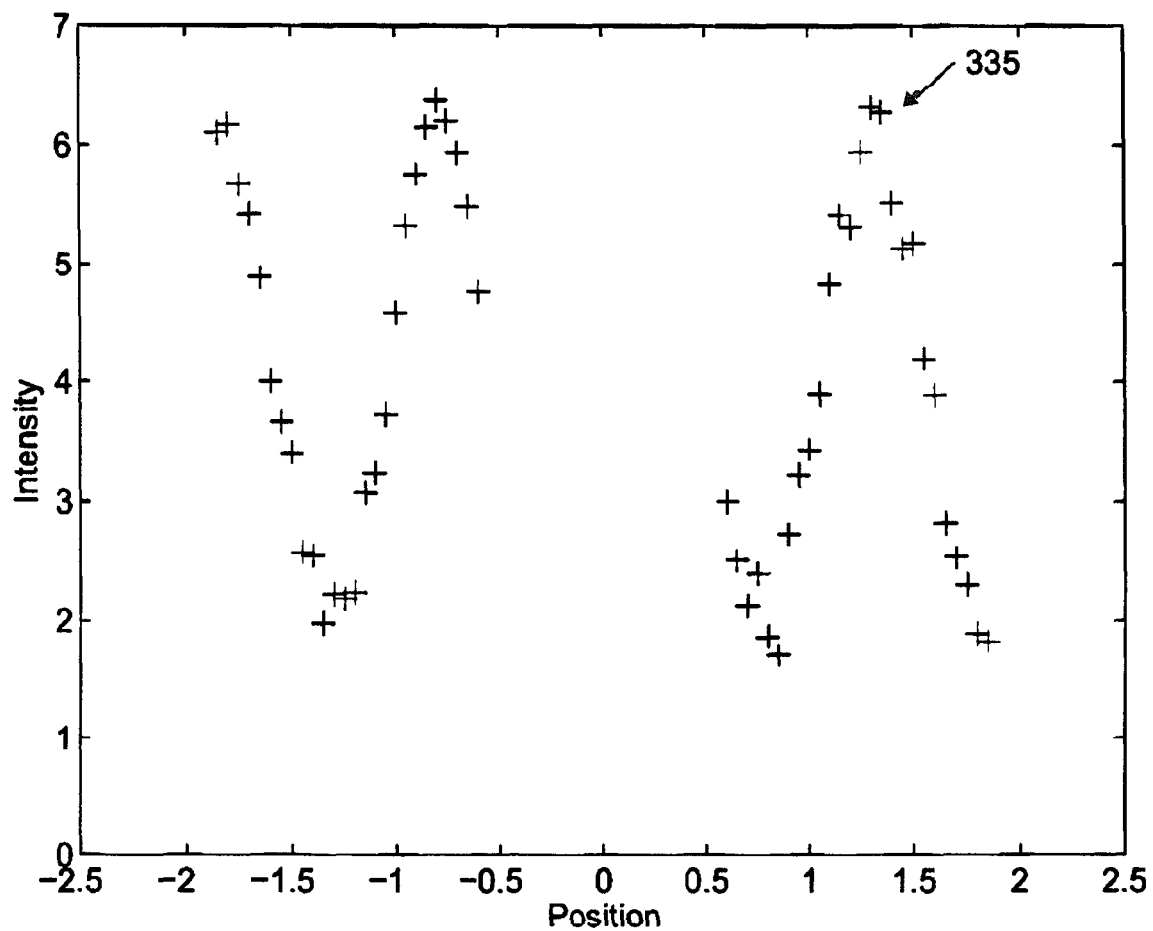
Figure 15:
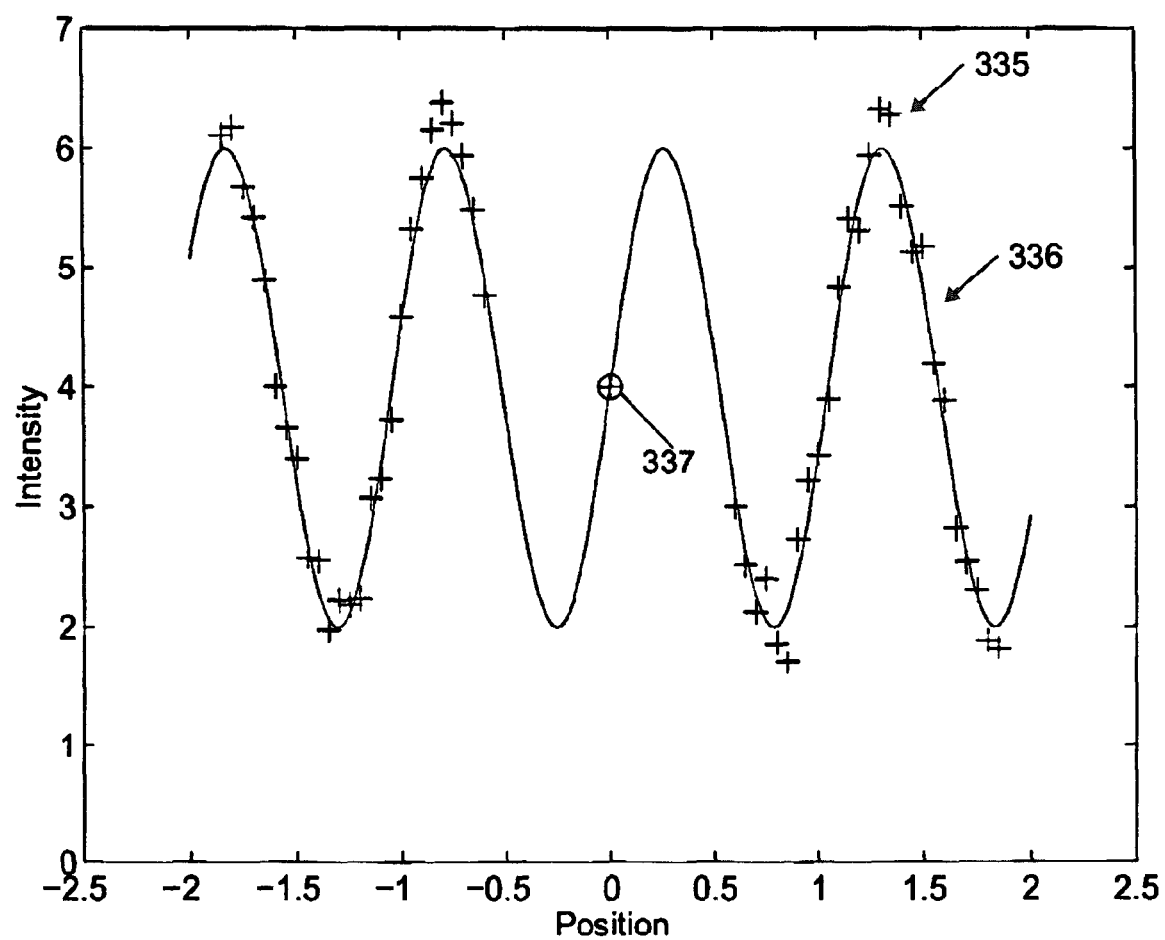

FIGS. 14 and 15 show the comparable steps of processing for a split ODR Region. Example data are shown at 335. A sinusoid is fit to the data at 336, and the Detectable Property is measured at point (337), which ideally corresponds to the Point of Measurement on the ODR Region. Because the ODR Region is split in the preferred embodiment, there is no actual data present at the point (337). However, because a well known curve is interpolated between data to the left and right of the Point of Measurement, and because interpolation can lead to accurate results, the Detectable Property of the ODR Pattern is accurately measured at Point of Measurement, even though there is no data at the point (337).

Figure 1:
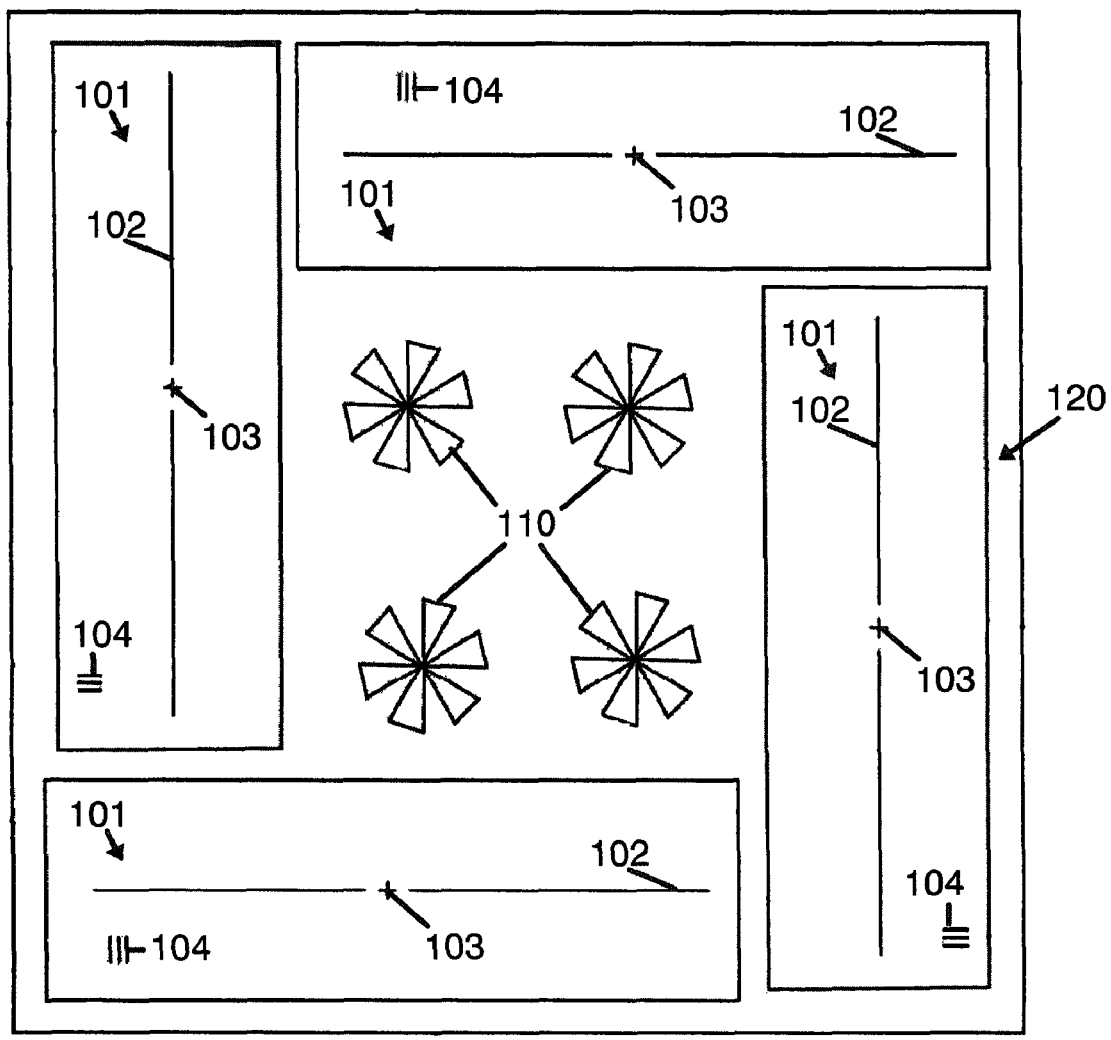
FIG. 1 shows a schematic illustration the ODR Source.
Figure 2:
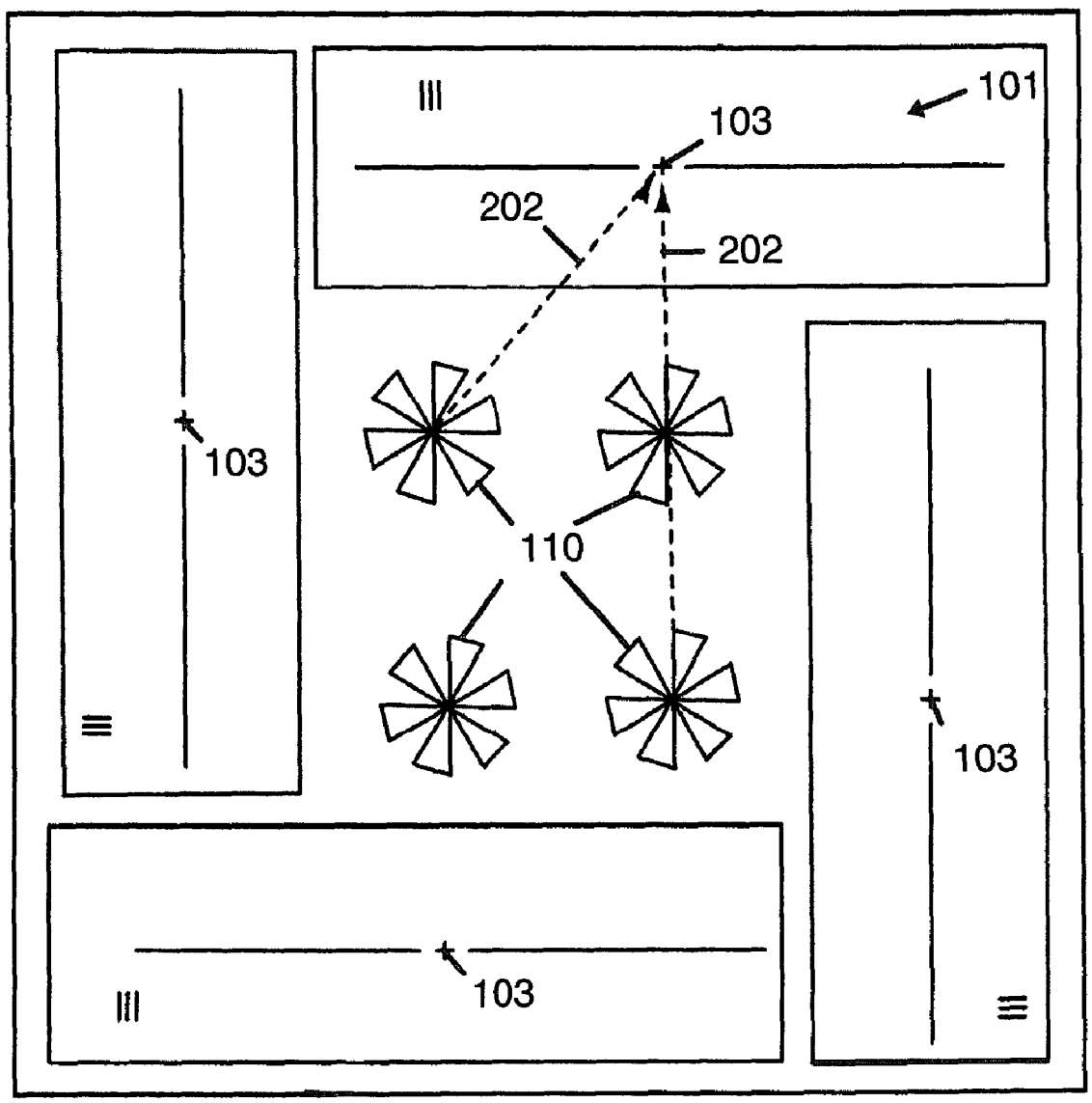
FIG. 2 illustrates the Determination of the Point of Measurement.
Figure 3:
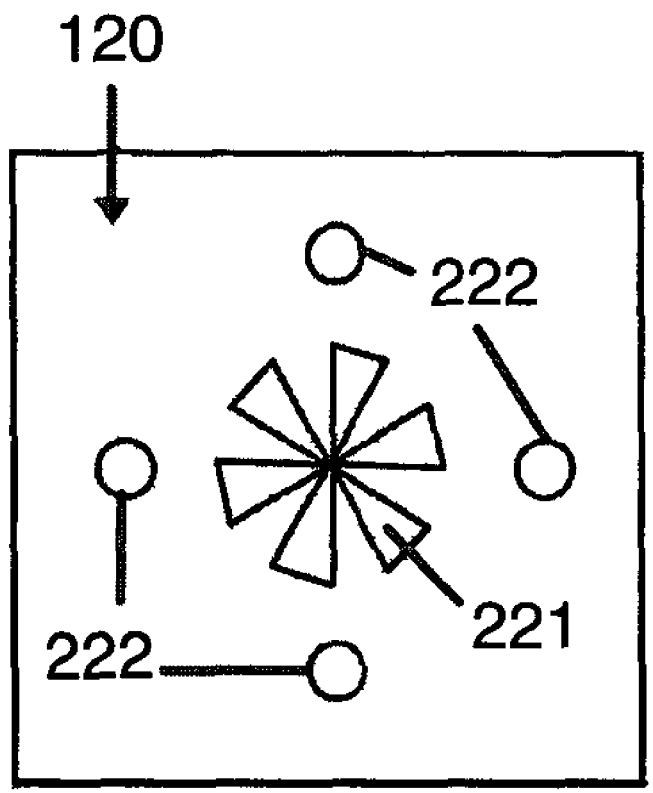
FIG. 3 is a diagram used to explain refractive offset.
Figure 4:
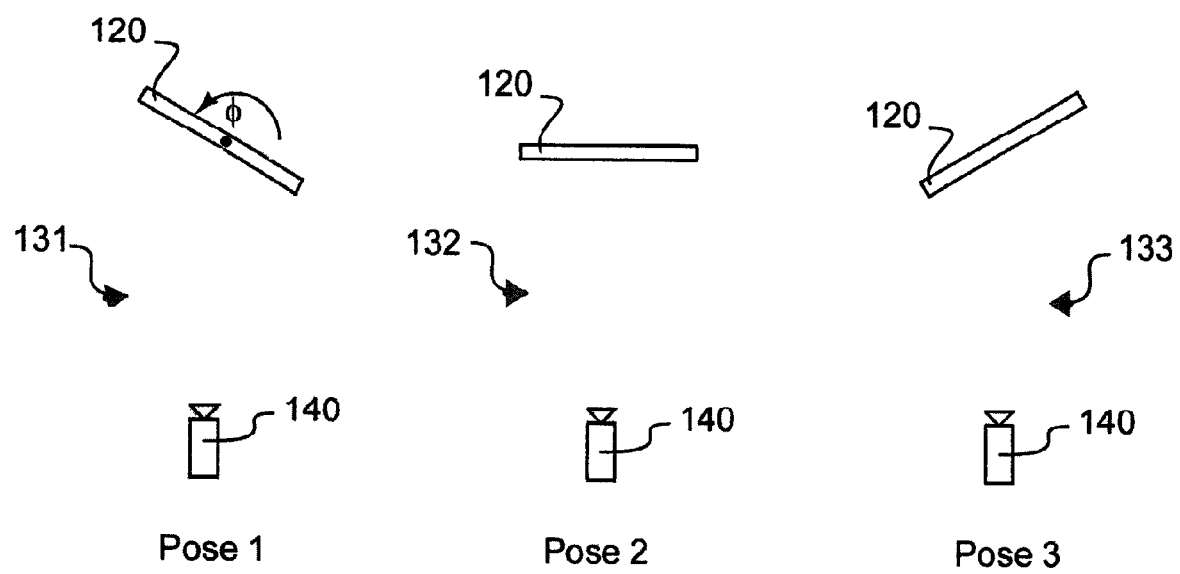
FIG. 4 is a second diagram used to explain refractive offset.
Figure 5:
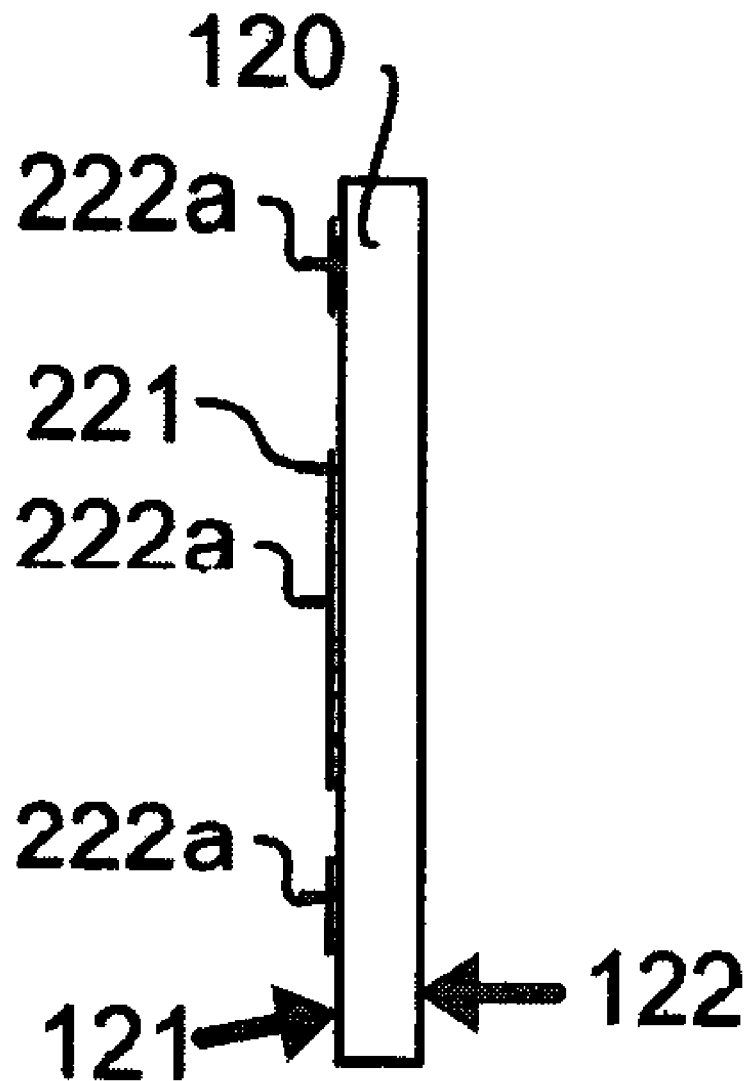
FIG. 5 is a side view showing all of Landmarks on the Transparent Substrate.
Figure 6:
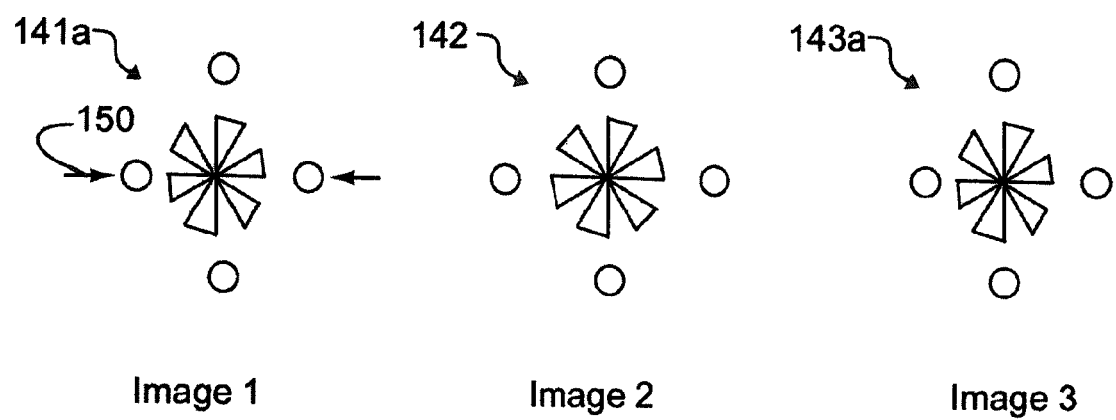
FIG. 6 illustrates the three images obtained in the three poses of FIG. 5 using an Orientation Dependent Radiation Source.
Figure 7:
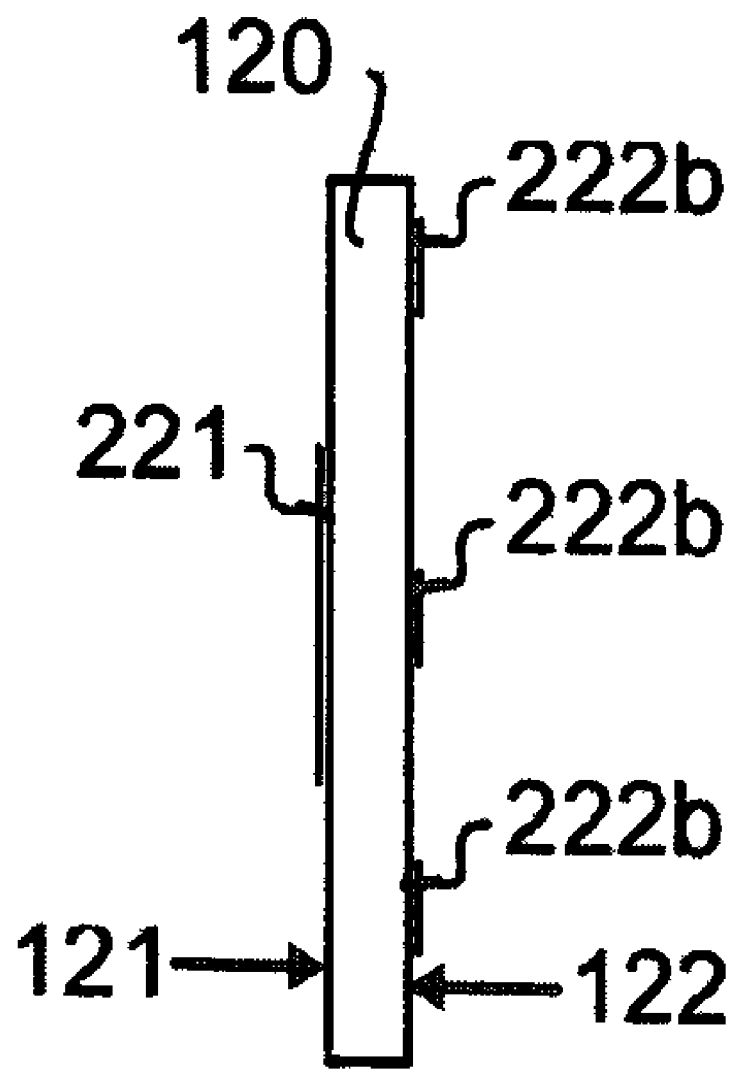
FIG. 7 is a side view showing Landmarks on the Front Face of a Transparent Substrate and Landmarks on the Back Face of the Transparent Substrate.
Figure 8:
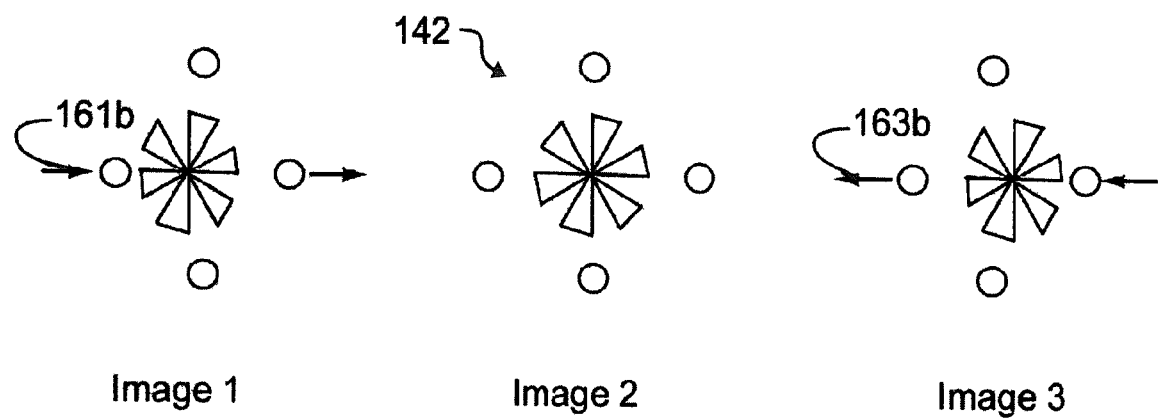
FIG. 8 illustrates the three images obtained in the three poses of FIG. 5 using an Orientation Dependent Radiation Source.

An additional aspect of the present invention is that it provides a means to resolve the Cosine Ambiguity. The Central Landmark (221) in FIGS. 3-8, must be on the Observation Surface of the ODR Source. However, because the Point of Measurement is determined by the Central Landmark alone, without projection or reference to other Landmarks, it is possible to place the remaining Landmarks on the Back Face (122) of the ODR Source (222b) in FIG. 7. With the peripheral Landmarks located on the Back Face, only the peripheral Landmarks are displaced by Back-to-Front shift when the target is tilted. This produces a shift between the central Landmark and peripheral Landmarks, as seen in FIG. 8. The Back-to-Front shift of Landmarks on the Back Face, relative to the position of the central Landmark on the Front Face, indicates the correct branch of the Cosine Ambiguity.

The preferred embodiment heretofore described is one embodiment of the invention. Those skilled in the arts will realize that variations and modifications make many embodiments possible.

I hereby claim:

1. An apparatus for an orientation dependent radiation source comprising:
   (a) at least two radiation patterns, wherein each radiation pattern has a longitudinal axis;
   (b) a detectable property within each radiation pattern that is measured at a point of measurement located on the corresponding longitudinal axis; and,
   (c) a landmark located at the point of measurement,
      wherein the longitudinal axis of each radiation pattern is arranged to intersect at a point of intersection corresponding to the point of measurement of the detectable property for each of the at least two radiation patterns.

2. The apparatus of claim 1, wherein a landmark is located at the point of intersection.

3. A method of determining orientation comprising the steps of:
   (a) capturing an image of an orientation dependent radiation source,
   (b) detecting a landmark located at a point of measurement in an image of the orientation dependent radiation source;
   (c) measuring a detectable property at the point of measurement; and,
   (d) determining an orientation in the image of the orientation dependent radiation source based on the measurement of the detectable property, wherein the method of determining orientation further comprises the steps of:
      (i) locating at least one landmark on a front surface of a transparent substrate that is included in the orientation dependent radiation source in the image; (ii) locating at least one landmark on a back surface of the transparent substrate that is included in the orientation dependent radiation source in the image; and, (iii) analyzing the locations of the landmark on the front surface of the transparent substrate and the landmark on the back surface of the transparent substrate in the image to determine on which the branch of the cosine ambiguity the orientation dependent radiation source lies.

4. A method of determining on which branch of the cosine ambiguity an orientation dependent radiation source lies comprising the steps of:
   (a) capturing an image of an orientation dependent radiation source;
   (b) locating at least one landmark on a front surface of a transparent substrate that is included in the orientation dependent radiation source in the image;
   (c) locating at least one landmark on a back surface of the transparent substrate that is included in the orientation dependent radiation source in the image; and,
   (d) analyzing the locations of the landmark on the front surface of the transparent substrate and the landmark on the back surface of the transparent substrate in the image to determine on which the branch of the cosine ambiguity the orientation dependent radiation source lies.

* * * * *